W. H. HALL.
Horse Hay-Rake.
No. 8,920. Reissued Oct. 7, 1879.
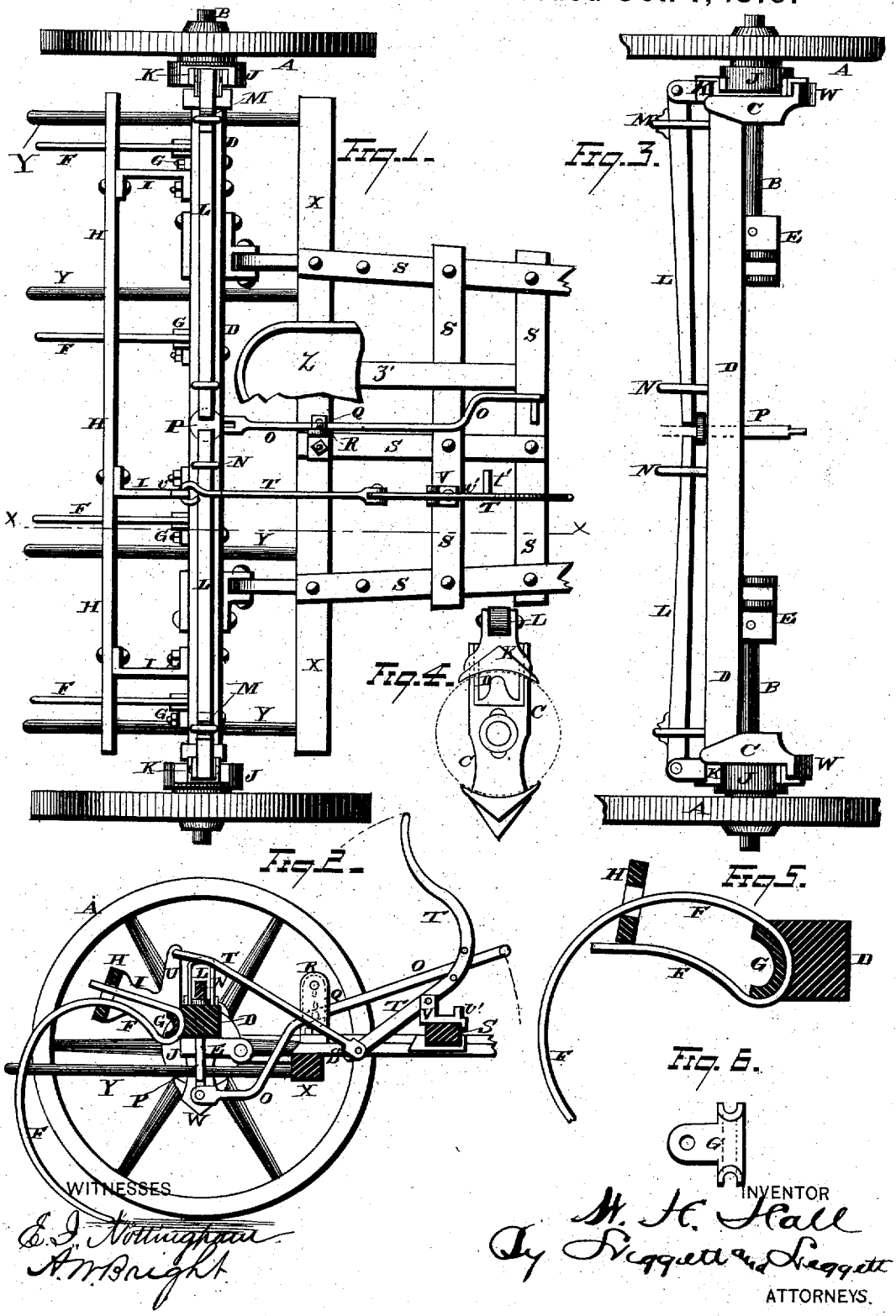
WITNESSES
E. J. Nottingham
A. M. Bright
INVENTOR
W. H. Hall
by Duggett and Duggett
ATTORNEYS.
N. PETERS, PHOTO-LITHOGRAPHER, WASHINGTON, D. C.

UNITED STATES PATENT OFFICE.

WILLIAM H. HALL, OF TIFFIN, OHIO.

IMPROVEMENT IN HORSE HAY-RAKES.

Specification forming part of Letters Patent No. 205,545, dated July 2, 1878; Reissue No. 8,920, dated October 7, 1879; application filed May 5, 1879.

*To all whom it may concern:*

Be it known that I, WILLIAM H. HALL, of Tiffin, in the county of Seneca and State of Ohio, have invented a new and useful Improvement in Horse Hay-Rakes, of which the following is a specification.

In the drawings, Figure 1 is a top view of my improved rake. Fig. 2 is a vertical section taken through the line *x x* of Fig. 1. Fig. 3 is a detail front view of the rake-head and attachments. Fig. 4 is a detail end view of the rake-head and the friction-blocks. Fig. 5 is a detail section of the rake-head cap and holding-board, showing a rake-tooth in place; and Fig. 6 is a detached view of one of the cap-plates.

Similar letters of reference indicate corresponding parts.

The object of this invention is to furnish improved wire-toothed hay-rakes which shall be so constructed as to be lighter, stronger, more convenient, and less liable to break or get out of order than rakes constructed in the usual way, and which at the same time shall be less expensive in manufacture.

In the instance shown in the drawings, A are the wheels, which revolve upon the journals of the axles B, which pass through bearing-holes in the block C, attached to the ends of the rake-head D.

The axles B are made short, and their inner ends are hinged to blocks E, attached to the under side of the rake-head D. The holes through the bearing-blocks C are made larger than the said axles B, to give the said axles a play within the said blocks.

F are the rake-teeth, which are made of spring-wire bent into the proper shape. The upper parts or ends of the rake-teeth F are curved or bent back upon themselves, as shown in Figs. 2 and 5. The bend of the rake-teeth F is placed in short grooves formed on the rear side of the rake-head D, where they are secured in place by the cap-plates G, which are bolted to the rear side of the said rake-head D, and have curved grooves formed upon their inner sides to receive and fit upon the bends of the rake-teeth F. The forward curved portion of these cap-plates fit partially in said grooves of the rake-head, thereby causing them the better to maintain the rake-teeth in position and enable them to resist lateral strain.

The rake-teeth F pass through short slots in the holding-board H, which is attached to the rear ends of arms or brackets I. The other ends of the brackets I are securely bolted to the rear side of the rake-head D.

The upper end of the rake-teeth F may be bent over upward, as shown in Fig. 2, or downward, as shown in Fig. 5. In the first case the ends pass through the slots of the holding-board H with the body of the rake-teeth. In the latter the said ends rest against the lower edge of the holding-board H, as shown in Fig. 5.

By this construction the upper parts of the rake-teeth serve as springs to hold the said teeth down to their work, and at the same time give the said teeth sufficient elasticity to pass over obstructions.

Upon the inner ends of the hubs of the wheels A are formed, or to them are attached, friction-wheels J, upon which rest the brake-blocks K. The brake-blocks K are pivoted to the outer ends of the horizontal levers L, which levers extend along the upper side of the rake-head D, and are pivoted near their outer ends to a staple, M, or other suitable device attached to the said rake-head.

The inner ends of the levers L meet, or nearly meet, at the center of the rake-head, and their inner ends pass through guide-staples N, attached to the said rake-head, and by which the movement of the said levers is limited.

By this construction, by raising the inner ends of the levers L the brake-blocks K will be forced down upon the friction-wheels J, so that the wheels A will be compelled to carry the rake-head with them in their revolution, and will thus raise the rake-teeth to drop the collected hay. The rake-teeth are allowed to fall back into working position by releasing the inner ends of the said levers L.

The inner ends of the levers L are raised by means of a foot-lever, O, which may be arranged in various ways, one of which is as follows: P is a bolt, passing down through the center of the rake-head D, and the head of which is made of such a size that the inner ends of both the levers L may rest upon it, so that the said levers will be operated to apply the brakes by moving the said bolt upward. The lower end of the bolt P is pivoted to the end of the foot-lever O. The lever O is pivoted to the end of the short swinging arm Q, the upper end of which is pivoted to the upper end of the standard R, attached to the thill-frame S, so that the operation of the foot-lever O will be unaffected by the movement of the rake-head D when dumping the hay. The rake-teeth may be pushed back to the ground, and held in working position by a hand-lever, T, the rear end of which is pivoted to the rake-head D, or to an arm, U, attached to the said rake-head.

The lever T is jointed, and is pivoted at a little distance in front of its joint to a plate, V, attached to the thill-frame. By drawing the lever toward him the driver may elevate the teeth when the rake is standing still, or lift it for the purpose of backing his team or turning around. The lever T has a foot-rest, $t'$, formed upon it, so that the driver with his foot can hold the rake-teeth down to the ground, leaving his hands free to guide and control his team. The downward movement of the locking-lever T is limited by a lug, $v'$, formed upon the forward part of the pivot-plate V.

To the lower side of the bearing-block C are attached, or upon them are formed, friction-blocks W, against which the friction-wheels J are pressed when the brake-blocks K are forced down upon them, so that the said friction-wheels J will be clamped between two brake-blocks, and will thus be held securely.

In the case of light and short rakes the lower friction-blocks, W, need not be used; but in the case of long and heavy rakes they may be used with advantage.

It will be noticed that as the brake blocks or shoes are forced against the friction-wheels J the levers L change their fulcrums to their shoes and exert a lifting-strain upon their former fulcrums M, thus forcing the brake-blocks W against the hub and dividing the strain between the two brake-shoes upon opposite sides of the hub.

To the rear end of the thill-frame S is attached a cross-bar, X, to the rear side of which are attached arms or fingers Y, which project so as to pass between the rake-teeth and push off the collected hay as the said rake-teeth are raised from the ground.

Z is the driver's seat, which is attached to the upper end of the inclined standard $z'$, the lower part of which is secured to the thill-frame S.

What I claim is—

1. A rake-head provided with a brake-shoe, adapted to be brought into frictional contact with the wheel upon one side of its axle, in combination with a lever attached to said rake-head and provided with a brake-shoe adapted to be brought into frictional contact with the same wheel on the opposite side of its axle, whereby the teeth may be elevated and the hay dumped, substantially as and for the purposes described.

2. The combination, with the rake-head, of a brake-shoe attached thereto and provided with an elongated passage for the axle, together with lever mechanism for raising and lowering the rake-head, the same being adapted to operate so that the rake-head may be sufficiently separated from the axle radially to bring the shoe into frictional contact with a friction-wheel formed on the ground-wheel, substantially as set forth.

3. The combination, with the axle of a rake, of a rake-head, D, adapted to turn about the said axle, the rake-head provided with a brake-shoe, W, with an elongated slot in its support for the passage of the axle, and provided also with a lever, L, brake-shoe K, and fulcrum M, substantially as and for the purpose described.

4. The combination, with a tooth bent back upon itself and a rake-head whose rear side is provided with a transverse groove, of a cap-plate, which clamps said tooth bend in said groove and is itself fitted in the latter, substantially as set forth.

5. The combination, with the brake-levers fulcrumed to the rocking rake-head, the plunger on which their inner ends rest, and the foot-lever, of the standard secured to the thill-frame and its pendulum-arm, to which said foot-lever is pivoted, substantially as set forth.

6. The combination of the wire teeth F, having their upper ends bent back upon themselves to form springs, and the cap-plates G, provided with grooves upon their inner sides, with the rake-head D, the holding-board H, and the arms or brackets I, substantially as herein shown and described.

Witness my hand and seal this 3d day of April, A. D. 1879.

WM. H. HALL. [L. S.]

Witnesses:

ROBERT LYSLE,

C. C. PARK.